Jan. 3, 1950     H. S. WILLIAMS     2,493,561
TWO-SEATED TRICYCLE
Filed March 18, 1947     2 Sheets—Sheet 1
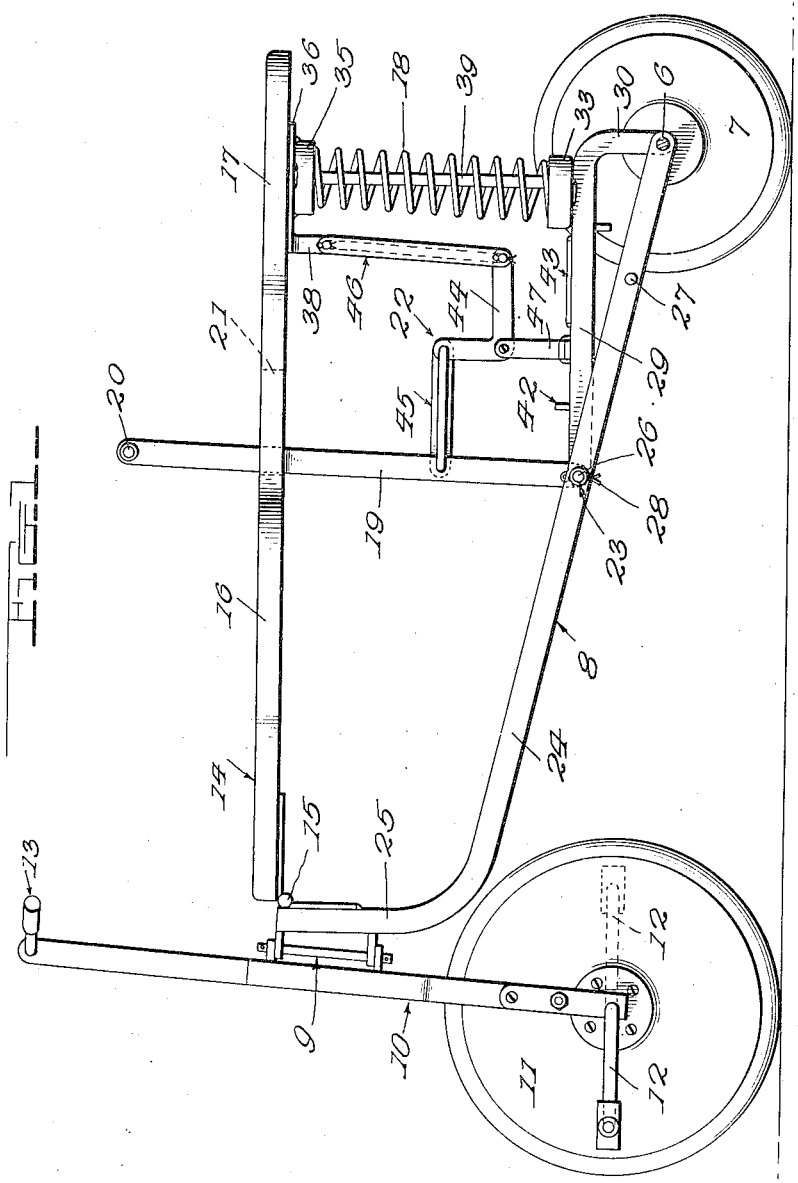
Inventor
Harry S. Williams
By
H.B.Wilson &Co.
Attorney

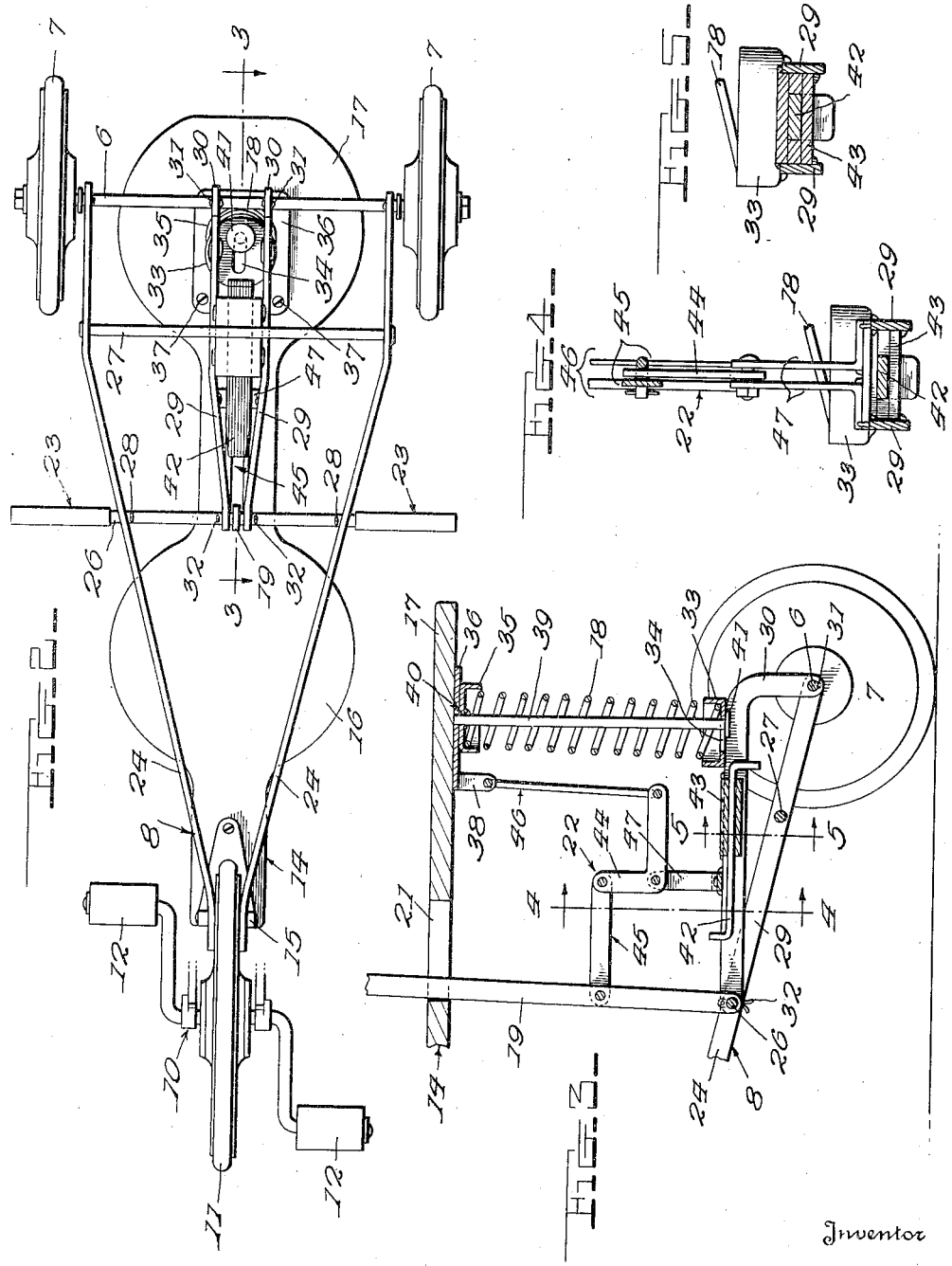

Patented Jan. 3, 1950

2,493,561

UNITED STATES PATENT OFFICE 2,493,561

TWO-SEATED TRICYCLE

Harry S. Williams, North Little Rock, Ark., assignor, by direct and mesne assignments, to Roc-a-Ride Corporation, Little Rock, Ark.

Application March 18, 1947, Serial No. 735,325

8 Claims. (Cl. 280—202)

The invention aims to provide a novel and advantageous tricycle having front and rear seats, which may be ridden by either one or two children, all pedaling and steering, however, being performed by a child occupying the front seat.

A further object is to provide a tricycle of the type set forth having novel means operable by a child on the rear seat for causing enjoyable vertical movements of both seats, simulating the movements of riders on horseback, whether the tricycle be moving or stationary, and this feature makes the tricycle an entertaining toy for indoor use also, even if insufficient floor space be available or parents instructions be such as to prohibit indoor pedaling.

Another object is to make novel provision for holding the seats against vertical movement if desired, permitting use as an ordinary tricycle.

Yet another object is to provide a rather simple and inexpensive structure which may be expeditiously manufactured and profitably sold at a reasonable price.

Figure 1 of the accompanying drawings is a side elevation with one rear wheel removed.

Fig. 2 is a bottom view.

Fig. 3 is a fragmentary longitudinal section on line 3—3 of Fig. 2.

Figs. 4 and 5 are detail transverse sections on lines 4—4 and 5—5 of Fig 3, respectively.

A preferred construction has been illustrated and will be rather specifically described, with the understanding, however, that within the scope of the invention as claimed, variations may be made.

A rear axle 6 is provided, having wheels 7 at its ends; and the rear end of a chassis frame 8 is supported by said axle 6. The front end of this frame is pivotally connected at 9 with a front wheel fork 10, in which a front wheel 11 is mounted. This wheel is provided with pedals 12, and the upper end of the fork 10 has appropriate steering means 13.

An elevated longitudinally extending seat member 14 is disposed above the frame 8, the front end of said member 14 being hinged at 15 to the front end of said frame, to permit vertical swinging of said member. This member is provided with front and rear seats 16 and 17 respectively, and its rear end is yieldably supported by means of a coiled spring 18. The pedals 12 and the steering means 13 are accessible to a child upon the front seat 16, permitting him to propel and steer the vehicle. In front of the seat 17, a forwardly and rearwardly swingable hand lever 19 is mounted on the chassis frame 8, said lever having two laterally projecting hand-grips 20 accessible to a child occupying said seat 17. This lever 19 extends through a slot 21 in the seat member 14, and its lower portion is connected with the rear end of said member 14 by connecting means 22. When lever 19 is moved forwardly and rearwardly, the connecting means 22 serves to move the rear end of the seat member 14 vertically. Thus, a child on the rear seat 17 may cause the vehicle to simulate the movements of a horseback rider, whether the front seat 16 be occupied or not. Provision is also made, however, for holding the member 14 against vertical movements, if desired, this being particularly advantageous if a very small child is to be taken for a ride upon the rear seat 17. The child may tightly grip the hand-grips 20 and place his feet upon footrests 23 with which the chassis frame 8 is provided, and may, therefore, conveniently ride with little danger of falling off.

In the present disclosure, the chassis frame 8 includes two side bars 24 suitably supported at their rear ends upon the axle 6, said side bars 24 inclining forwardly and converging forwardly from said axle, and having upwardly bent front ends 25 to which the pivot means 9 and the hinge means 15 are suitably connected. Some distance in front of the wheels 7, a transverse rod 26 extends between the side bars 24, and behind this rod a tie-rod 27 is secured to said bars 24. The rod 26 extends through openings in these bars and projects beyond them to provide the footrests 23 which are preferably rubber-covered. The rod 26 may well be held against endwise sliding by means of cotter pins or the like 28 extending through it at the inner sides of the bars 24. The central portion of this rod 26 constitutes a fulcrum for the lever 19, and at opposite sides of this lever, two closely spaced longitudinal bars 29 are mounted on said rod 26. These bars 29 extend horizontally rearward from rod 26 and are provided with downwardly bent rear ends 30 supported upon the rear axle 6. These bar ends are preferably welded to the axle as indicated at 31 in Fig. 2, and the front ends of the bars 29 may be held against spreading by means of cotter pins or the like 32 extending through the rod 26. Upon the bars 29, near their downwardly bent ends 30, an upwardly open cup 33 is welded or otherwise secured, the bottom of said cup being formed with a slot 34 for a purpose to appear. This cup receives the lower end of the spring 18 above described, and the upper end of said spring is received in a downwardly open cup 35. This cup is welded or otherwise secured to a plate 36 which is secured by screws or the like 37 (Fig. 2) to the lower side of the rear seat 17. The front end of this plate is provided with a downwardly projecting lug 38 for a purpose to appear. The upper end of a vertical rod 39 is suitably secured at 40 (Fig. 3) to the cup 35 and plate 36. This rod extends downwardly within the spring 18, extends through the slot 34 of the lower cup 33, and is provided at its lower end with a head 41. This head abuts the lower side of the cup 33 to limit the ascent of the member 14. Also, a bolt 42 may be rearwardly projected under the head 41, to prevent descent of rod 39 and to, therefore, prevent downward swinging of the seat member 14 when desired. The bolt 42 is slidably mounted in an appropriate guide 43 which is located between the bars 29 and may be welded or otherwise secured thereto.

The connecting means 22, above described, comprises a bell crank 44 and two links 45 and 46. The bell crank 44 is fulcrumed upon an upstanding bracket 47 which is suitably secured to the bars 29; the link 45 connects one end of said bell crank with the hand lever 19, and the link 46 connects the other end of said bell crank with the lug 38 of the seat-carried plate 36.

From the foregoing, taken in connection with the accompanying drawings, it will be seen that novel and advantageous provision has been made for carrying out the objects of the invention, and while preferences have been disclosed, attention is again invited to the possibility of making variations within the scope of the invention as claimed.

What is claimed is:

1. A child's vehicle comprising a chassis frame, rear wheels supporting the rear end of said chassis frame, a front wheel fork pivoted to the front end of said chassis frame and having steering means at its upper end, a front wheel mounted in said fork and having pedals, an elevated horizontally elongated member extending longitudinally over said chassis frame and having a front seat and a rear seat, said pedals and steering means being accessible to a child on said front seat, hand-grips and foot-rests for a child on said rear seat, hinge means mounting said elongated member on said chassis frame for vertical movement, and spring means acting jointly with said hinge means for yieldably supporting said elongated member.

2. A child's vehicle comprising a chassis frame, rear wheels supporting the rear end of said chassis frame, a front wheel fork pivoted to the front end of said chassis frame and having steering means at its upper end, a front wheel mounted in said fork and having pedals, an elevated horizontally elongated member extending longitudinally over said chassis frame and having a front seat and a rear seat, said pedals and steering means being accessible to a child on said front seat, hand-grips and foot-rests for a child on said rear seat, means hingedly supporting the front end of said elongated member on the front end of said chassis frame, and spring means yieldably supporting the rear end of said elongated member.

3. A child's vehicle comprising a chassis frame, rear wheels supporting the rear end of said chassis frame, a front wheel fork pivoted to the front end of said chassis frame and having steering means at its upper end, a front wheel mounted in said fork and having pedals, an elevated horizontally elongated member extending longitudinally over said chassis frame and having a front seat and a rear seat, said pedals and steering means being accessible to a child on said front seat, means hingedly supporting the front end of said elongated member on the front end of said chassis frame, spring means yieldably supporting the rear end of said elongated member, a forwardly and rearwardly swingable lever fulcrumed at its lower end on said chassis frame and having hand-grips at its upper end accessible to a child on said rear seat, connecting means connecting said lever with said elongated member to vertically swing the latter as said lever is operated, and foot-rests for a child occupying said rear seat.

4. A structure as specified in claim 3; said connecting means comprising a bell crank fulcrumed on said chassis frame and having a vertical arm and a horizontal arm, a link connecting said vertical arm of said bell crank with said lever, and a second link connecting said horizontal arm of said bell crank with said elongated member.

5. A child's vehicle comprising a rear axle having wheels at its ends, a front wheel fork having steering means at its upper end, a front wheel mounted in said fork and having pedals, a chassis frame having side bars converging forwardly from said rear axle, means pivotally connecting said fork with the front end of said chassis frame, a transverse rod extending between said side bars and spaced forwardly from said rear axle, two closely spaced longitudinal bars supported at their front ends on said rod and supported at their rear ends on said rear axle, a spring support secured upon said closely spaced bars near said rear ends thereof, a vertical coiled compression spring supported by said spring support, and an elevated longitudinal seat member having its front end hinged to the front end of said chassis frame, the rear end of said seat member being supported on said spring.

6. A structure as specified in claim 5; together with a vertical lever having its lower end fulcrumed on said rod between said closely spaced bars, said seat member having a longitudinal slot through which said lever extends and having front and rear seats in front of and behind said slot respectively, hand-grips on the upper end of said lever to permit a child on said rear seat to forwardly and rearwardly swing said lever, and connecting means between said lever and seat member for vertically swinging the latter as said lever is operated, said connecting means including an element mounted on said closely spaced bars.

7. A structure as specified in claim 5; said spring support having an opening, and a vertical rod within said spring and connected at its upper end with said seat member, the lower end of said rod extending through said opening and having a head between said closely spaced bars, said head being cooperable with said spring support to limit upward swinging of said seat member.

8. A structure as specified in claim 5; said spring support having an opening, a vertical rod within said spring and connected at its upper end with said seat member, the lower end of said rod extending through said opening and having a head between said closely spaced bars, said head being cooperable with said spring support to limit upward swinging of said seat member, and a bolt mounted for horizontal sliding between said closely spaced bars, said bolt being projectable under said head when desired, to hold said rod against descent, thereby holding said seat member against downward swinging.

HARRY S. WILLIAMS.

REFERENCES CITED

The following references are of record in the file of this patent:

UNITED STATES PATENTS

| Number | Name | Date |
| --- | --- | --- |
| 935,854 | Linerode | Oct. 5, 1909 |
| 1,607,402 | Leonardi | Nov. 16, 1926 |
| 1,730,557 | Brackett | Oct. 8, 1929 |